(12) United States Patent
Poole

(10) Patent No.: US 9,864,084 B2
(45) Date of Patent: Jan. 9, 2018

(54) COHERENT NOISE ATTENUATION METHOD

(71) Applicant: CGG SERVICES SA, Massy (FR)

(72) Inventor: Gordon Poole, East Grinstead (GB)

(73) Assignee: CGG SERVICES SAS, Massy (FR)

( * ) Notice: Subject to any disclaimer, the term of this patent is extended or adjusted under 35 U.S.C. 154(b) by 827 days.

(21) Appl. No.: 14/295,639

(22) Filed: Jun. 4, 2014

(65) Prior Publication Data
US 2014/0365135 A1  Dec. 11, 2014

Related U.S. Application Data

(60) Provisional application No. 61/832,504, filed on Jun. 7, 2013, provisional application No. 61/832,456, filed on Jun. 7, 2013.

(51) Int. Cl.
*G01V 1/00* (2006.01)
*G01V 1/36* (2006.01)

(52) U.S. Cl.
CPC ........ *G01V 1/36* (2013.01); *G01V 2210/3246* (2013.01)

(58) Field of Classification Search
CPC .. G01V 1/3808; G01V 2210/165; G01V 1/30; G01V 1/282; G01V 1/36; G01V 1/38
USPC .............................................. 702/2, 14, 17
See application file for complete search history.

(56) References Cited

U.S. PATENT DOCUMENTS

| | | |
|---|---|---|
| 2007/0159921 A1 | 7/2007 | Regone et al. |
| 2011/0158044 A1 | 6/2011 | Moldoveanu et al. |
| 2012/0014212 A1 | 1/2012 | Eick et al. |
| 2012/0320711 A1 | 12/2012 | Hite |
| 2013/0121109 A1 | 5/2013 | Baardman et al. |
| 2013/0163376 A1 | 6/2013 | Poole |
| 2014/0029379 A1 | 1/2014 | Roger et al. |

OTHER PUBLICATIONS

Invitation to Pay Additional Fees and, Where Applicable, Protest Fee, Communication Relating to the Results of the Partial International Search (Annex) in related International Application No. PCT/EP2014/061919, dated Feb. 5, 2015.
S. Baldock et al., "Orthogonal Wide Azimuth Surveys: Acquisition and Imaging", SEG Annual Meeting, San Antonio, Texas, SEG Technical Program Expanded Abstracts, Sep. 30, 2011, pp. 147-151, XP055164664.
E. Fromyr et al., "An Exploration-Scale Wide Azimuth Towed Streamer Case Study", SEG Annual Meeting, Las Vegas, Nevada, SEG Technical Program Expanded Abstracts, Nov. 14, 2008, pp. 1008-1012, XP055164662.

(Continued)

*Primary Examiner* — An Do
(74) *Attorney, Agent, or Firm* — Patent Portfolio Builders PLLC

(57) ABSTRACT

Computing device, computer instructions and method for denoising input seismic data d. The method includes receiving the input seismic data d recorded in a first domain by seismic receivers, wherein the input seismic data d includes pure seismic data ss relating to an exploration source and coherent noise data n generated by a man-made device; generating a model m in a second domain to describe the input seismic data d; and processing the model m to obtain an output seismic dataset d' indicative of seismic data substantially free of the coherent noise data n generated by the man-made device.

20 Claims, 10 Drawing Sheets

(56) References Cited

OTHER PUBLICATIONS

A. Long et al., "Multi-Azimuth and Wide-Azimuth Lessons for Better Seismic Imaging in Complex Settings", Proceedings of the 8th SEGJ International Symposium, Dec. 31, 2006, pp. 1-4, XP055164663.

P. Herrmann et al., "De-Aliased, High-Resolution Radon Transforms", SEG Technical Program Expanded Abstracts 2000, pp. 1953-1956.

D, Trad et al., "Latest Views of the Sparse Radon Transform", Geophysics, Jan.-Feb. 2003, pp. 386-399, vol. 68, No. 1.

S. Xu et al., "Antileakage Fourier Transform for Seismic Data Regularization", Geophysics, Jul.-Aug. 2005, pp. V87-V95, vol. 70, No. 4.

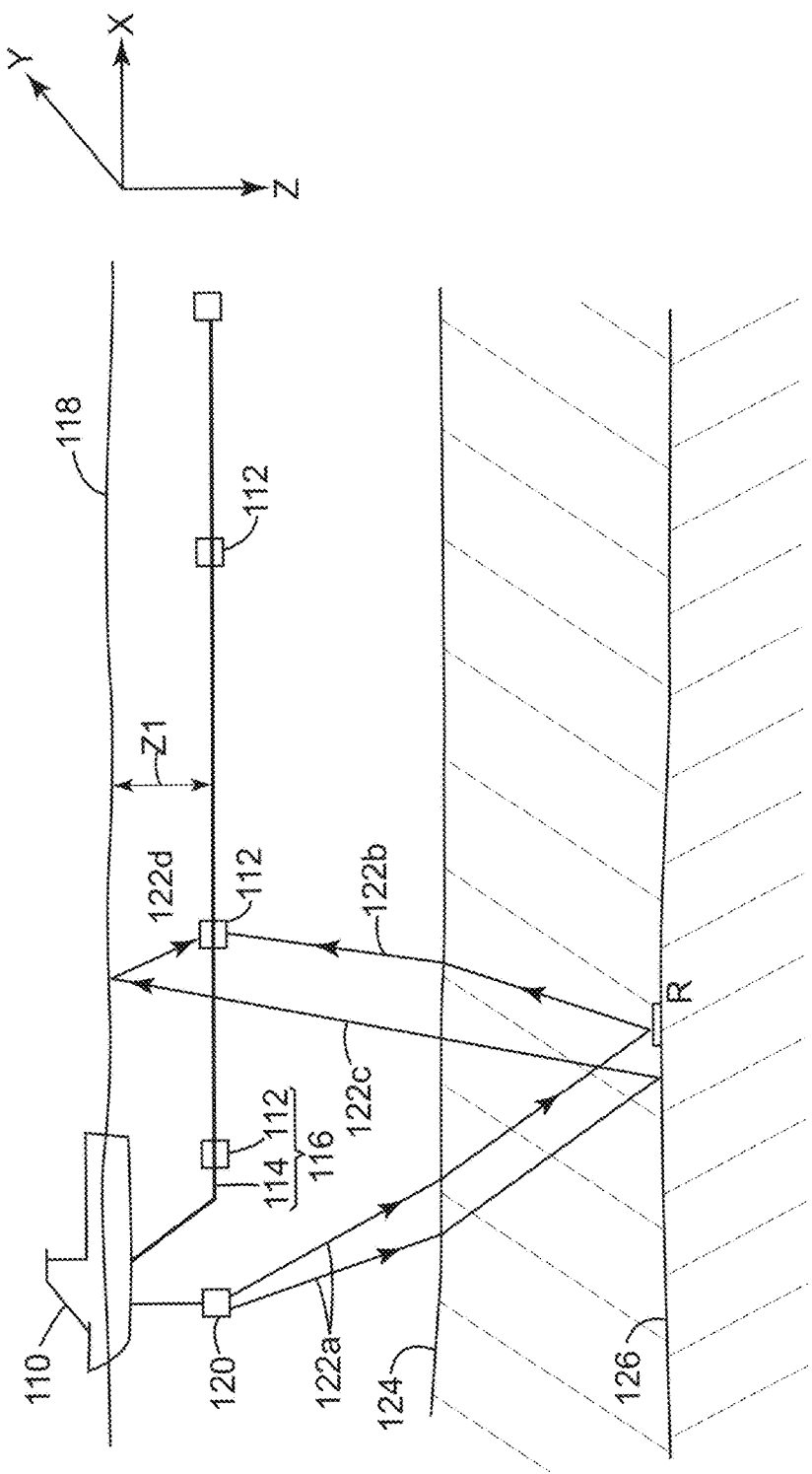

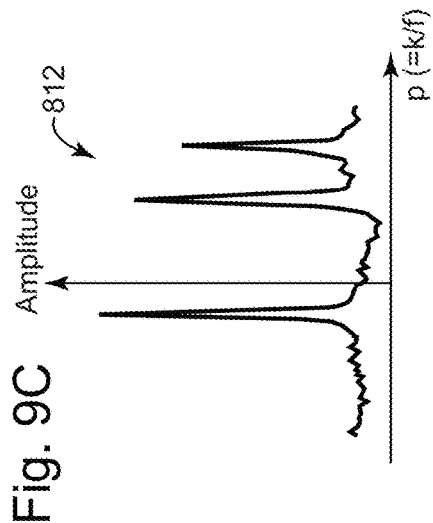
Fig. 9A
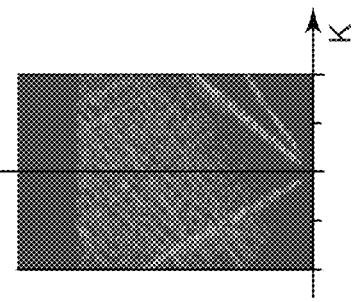
Fig. 9B
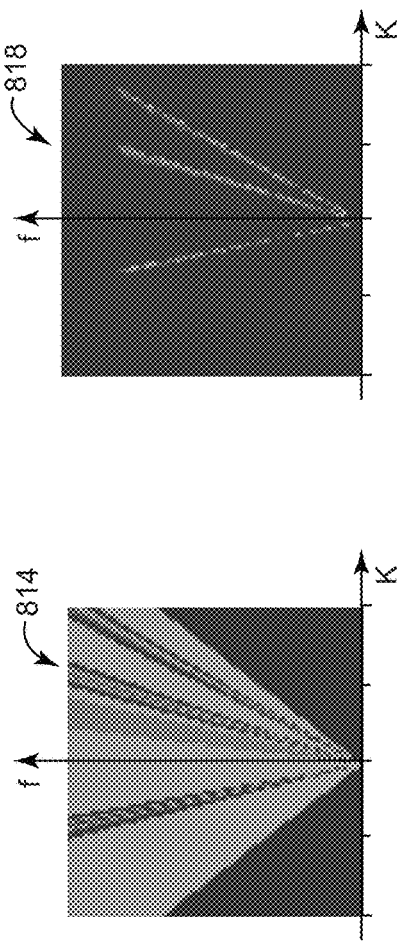
Fig. 9C
Fig. 9F
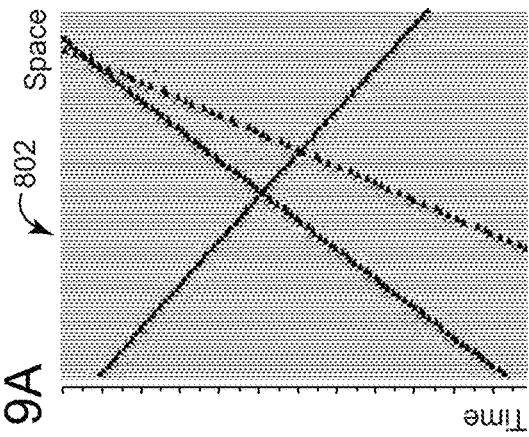
Fig. 9D
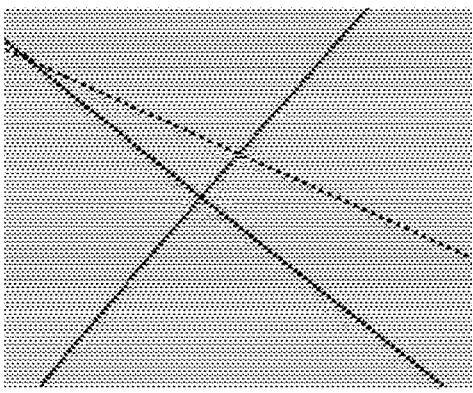
Fig. 9E

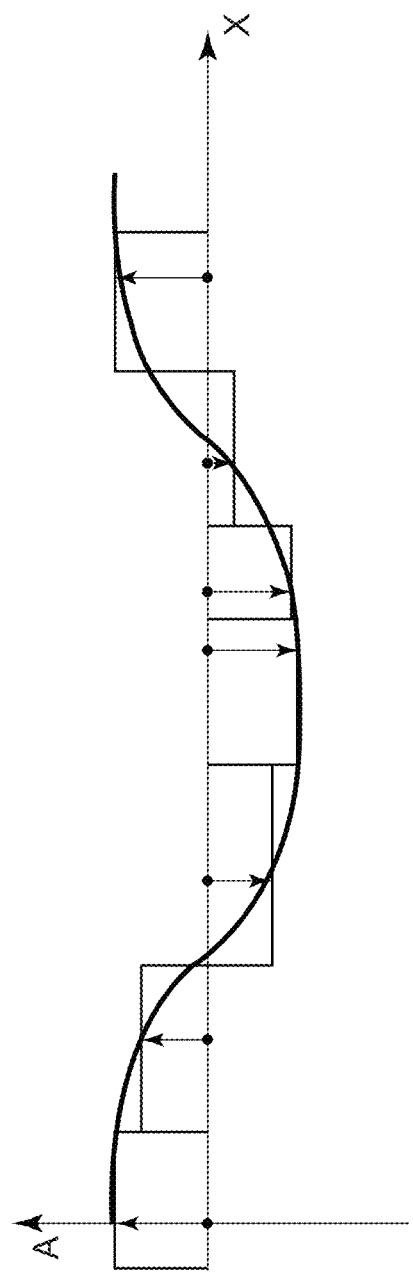

COHERENT NOISE ATTENUATION METHOD

CROSS-REFERENCE TO RELATED APPLICATIONS

The present application is related to and claims the benefit of priority of U.S. Provisional Application No. 61/832,456, filed Jun. 7, 2013, titled "Coherent Noise Attenuation Method," authored by G. Poole, and to U.S. Provisional Application No. 61/832,504, filed Jun. 7, 2013, titled "Data Interpolation and/or Denoise Constrained with Multi-Datasets," authored by G. Poole and H. Hoeber, the entire contents of which are incorporated herein by reference.

BACKGROUND

Technical Field

Embodiments of the subject matter disclosed herein generally relate to methods and systems and, more particularly, to mechanisms and techniques for attenuating coherent noise produced by man-made devices that are towed in water during a marine acquisition survey and/or interpolating the data based on multi-datasets.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic acquisition process, as shown in FIG. 1, a vessel 110 tows plural detectors 112, which are disposed along a cable 114. Cable 114 together with its corresponding detectors 112 are sometimes referred to, by those skilled in the art, as a streamer 116. Vessel 110 may tow plural streamers 116 at the same time. Streamers may be disposed horizontally, i.e., lie at a constant depth $z_1$ relative to the ocean surface 118. Also, plural streamers 116 may form a constant angle (i.e., the streamers may be slanted) with respect to the ocean surface.

Still with reference to FIG. 1, vessel 110 may also tow a seismic source 120 configured to generate an acoustic wave 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic wave. Parts of reflected acoustic wave 122b (primary) are recorded by various detectors 112 (recorded signals are called traces) while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

Recorded traces may be used to determine the subsurface (i.e., earth structure below water bottom 124) and to determine the position and presence of reflectors 126. However, ghosts disturb the accuracy of the final image of the subsurface and, for at least this reason, various methods exist for removing ghosts, i.e., deghosting, from the acquired seismic data.

In addition to ghosts, noise naturally occurring and noise produced by man-made devices associated with the seismic acquisition process also degrade the final image's accuracy. Some man-made devices are connected, for example, to towed streamers and they may be a constant, coherent source of noise. Examples of man-made devices generating unwanted but coherent noise include diverters, paravanes, tail buoys, birds and steering devices. These devices also cause drag and produce noise that travels down the streamer with a chevron shape, i.e., a symmetrical shape that may look like a wedge. Generally, noise from these man-made devices is linear in appearance. The noise's propagation along the cable may be dispersive. An example is illustrated in FIG. 2 for which the pressure data looks clean, but FIG. 3 shows the particle motion data 300 containing strong bird noise 302. Reference number 302 points to the bird noise, but it also points to the position of the bird along the streamer.

Noise 302 may be present at a range of frequencies, and traditional attempts to remove this noise often include frequency-wavenumber (FK) dip filtering or tau-p muting. Traditional approaches can be unsatisfactory because diffraction energy (which carries valuable seismic information) may be attenuated, the noise may be aliased, or an apex of the noise (which should be removed) may be left or generate artefacts.

Thus, there is a need for a new process to attenuate such noise where the position of the apex is known, and this process should not be limited to bird noise, but be applicable to any coherent noise with chevron appearance.

SUMMARY

According to an embodiment, there is a method for denoising input seismic data d that includes receiving the input seismic data d recorded in a first domain by seismic receivers, wherein the input seismic data d includes pure seismic data ss relating to an exploration source and coherent noise data n generated by a man-made device; generating a model m in a second domain to describe the input seismic data d; and processing the model m to obtain an output seismic dataset d' indicative of seismic data substantially free of the coherent noise data n generated by the man-made device.

According to another embodiment, there is a computing device for denoising input seismic data d, the computing device including an interface for receiving the input seismic data d recorded in a first domain by seismic receivers, wherein the input seismic data d includes pure seismic data ss relating to an exploration source and coherent noise data n generated by a man-made device; and a processor. The processor is configured to generate a model m in a second domain to describe the input seismic data d, and process the model m to obtain an output seismic dataset d' indicative of seismic data substantially free of the coherent noise data n generated by the man-made device.

According to still another exemplary embodiment, there is a computer-readable medium including computer-executable instructions, wherein the instructions, when executed by a processor, implement a method as noted in the above paragraph.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 is a schematic diagram of a conventional seismic data acquisition system having a horizontal streamer;

FIGS. 9A-F illustrate various steps of the method of FIG. 8;

FIG. 10 illustrates a method for determining integration weights; and

DETAILED DESCRIPTION

Figure 3:
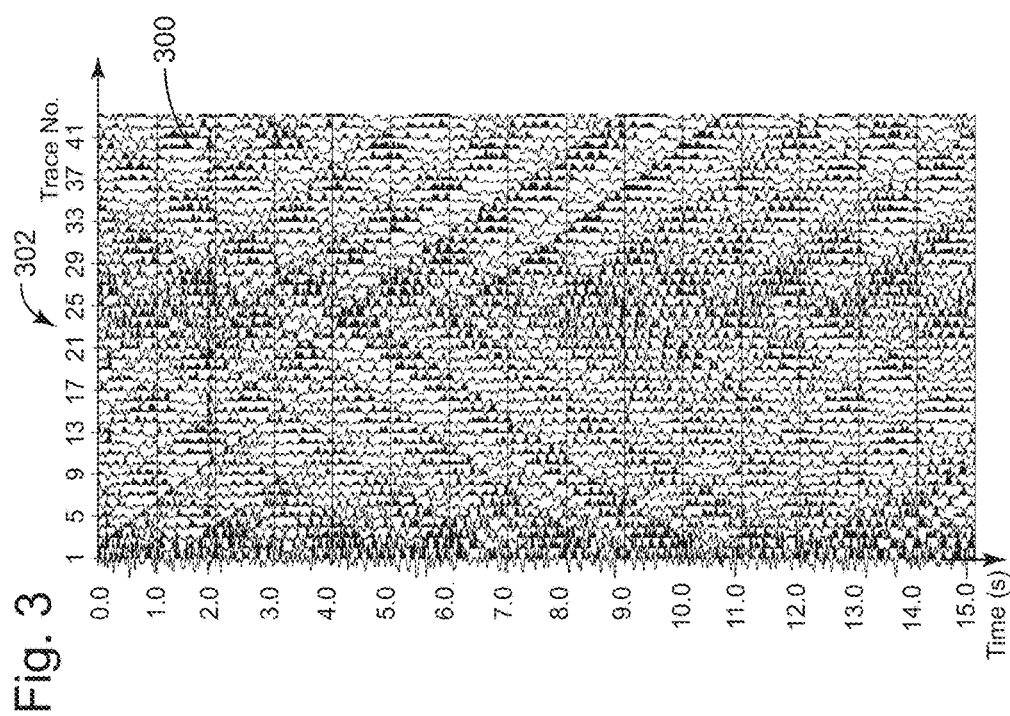
FIG. 3 illustrates particle motion data and coherent noise generated by man-made devices.
Figure 2:
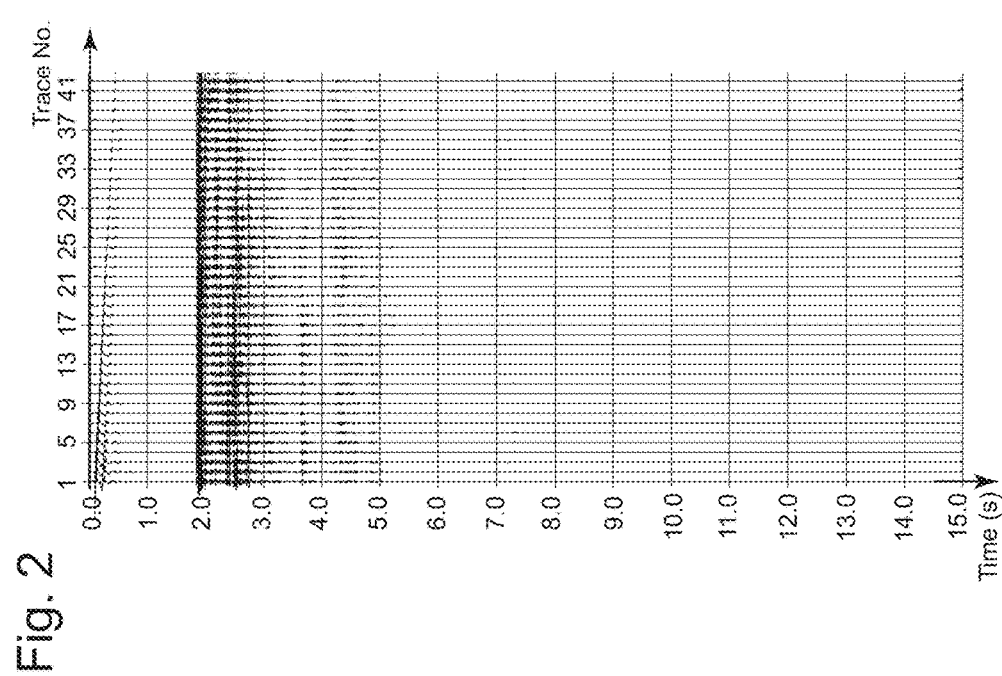
FIG. 2 illustrates hydrophone data and coherent noise generated by man-made devices.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to noise generated by a man-made device attached to a marine streamer. However, the embodiments to be discussed next are not limited to marine streamers. For example, the man-made device may be attached to a seismic source, to the towing vessel, or to the seismic spread (that includes the streamers) but without being directly attached to the streamers. The noise source may also relate to a man-made noise source external to the equipment relating to the seismic experiment. In a marine environment, examples may include external noise emanating from a rig, another vessel or sea bottom installation. The external noise may be due to industrial activity or diffraction from the rig/vessel. In one embodiment, the source of the noise is not man-made, but naturally occurs, e.g., sharp bite on the cable. The term noise may also relate to other undesired coherent noise in the data, e.g., multiple energy, ground roll, Vz noise, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, more than one model representation of the data are simultaneously construed to jointly model the coherent noise n and the pure seismic signals ss (i.e., seismic data that would be recorded if there were no noise generated by man-made devices associated with the seismic survey, where the pure seismic signals ss are related to an exploration seismic source). Mathematically, the models may be considered as two or more vectors of different values within a single model vector m. Noise n and pure seismic signals ss, which are intertwined (and referred to as input data d in the following; i.e. d=ss+n+r, where r relates to other noise which is not represented by the model, e.g. background random noise), are recorded by seismic receivers in a first domain. The input data d is used together with a transform L to construe the model m in a second domain. As the model may contain two or more vectors, it should be noted that the vectors may be in different model spaces. For example, the noise model may be linear and the pure seismic signal model may be parabolic. Transform L links model m to input seismic data d as discussed next. Transform L may include terms directed to the seismic signals and one or more terms related to man-made devices that generate the noise.

Prior to discussing the new method in more detail, note that a method that uses a tau-p model p is disclosed by U.S. patent application Ser. No. 13/334,776 (herein '776) authored by G. Poole. This method uses a surface datum tau-p model that represents input shot data. A transform from the tau-p model p to a shot domain (offset-time) combines the operations of redatuming and reghosting. Application '776 uses a least squares formulation given by:

$$d = Lp \quad (1)$$

or, in the expanded matrix form, $$\begin{pmatrix} d_1 \\ d_2 \\ d_N \end{pmatrix} = \begin{pmatrix} e^{-2\pi i f \tau_{pr}} - e^{-2\pi i f \tau_{gh}} \end{pmatrix} \begin{pmatrix} p_1 \\ p_2 \\ p_3 \\ p_M \end{pmatrix}, \quad (2)$$

where column vector d contains a frequency slice from the shot domain data (known), column vector p contains the surface datum tau-p model (unknown), and matrix L makes the transform (known) from the surface tau-p model to the input shot data. Matrix L combines the operations of redatuming and reghosting.

The time shifts for primary (up-going) and ghost (down-going) wave fields are given by:

$$\tau_{pr} = (h_n + \Delta h_{n,m})s_m - \Delta \tau_{n,m} \quad (3)$$

$$\tau_{gh} = (h_n - \Delta h_{n,m})s_m + \Delta \tau_{n,m}, \quad (4)$$

where $h_n$ is the offset of a given trace in column vector d, $s_m$ is the slowness of a given trace in the surface tau-p model, $\Delta h_{n,m}$ is the offset perturbation as described in the '776 application, and $\Delta \tau_{n,m}$ is the temporal perturbation as also described in the '776 application. Equation (1) can be solved in the time or spectral (e.g., frequency) domain using linear inversion. The method can be applied on the whole shot (cable-by-cable) or in spatial windows of a user-defined number of channels.

The present denoising method relies on an equation similar to equation (1) discussed above. However, the terms of the new equation are different from the terms of equation (1) as now discussed.

According to an embodiment, a joint modelling method to simultaneously derive models for the (coherent) noise n and pure seismic signal ss may be based on a conventional linear least squares Radon formulation, which relies on equation (5) as follows:

$$d = Lm, \quad (5)$$

or, if written in expanded form:

$$\begin{pmatrix} d_1 \\ d_2 \\ d_N \end{pmatrix} = \begin{pmatrix} e^{-2\pi i f p h} & \end{pmatrix} \begin{pmatrix} m_1 \\ m_2 \\ m_3 \\ m_M \end{pmatrix}, \quad (6)$$

where for a given frequency f, vector d contains rows relating to each trace in the gather (which is known as being the measured data and includes both seismic signal ss and noise n), m relates to the p-trace (slowness) model for the same frequency (this vector is unknown), p relates to the slowness of the relevant model trace (s/m), and h relates to the offset of the relevant data trace (d). Note that the offset is defined as a distance between a receiver and a reference object, e.g., a seismic source. Also note that input data d may include only pressure measurements, only particle motion measurements, or a mixture of pressure and particle motion measurements. Pressure measurements are typically recorded with pressure sensors, e.g., hydrophones and particle motion measurements are typically recorded with particle motion sensors, e.g., accelerometers or geophones. A particle motion sensor may be configured to measure displacement, velocity or acceleration of a particle and/or a pressure gradient of a field. Model m may be found using various known mathematical algorithms, for example, least squares inversion, LU decomposition, Cholesky factorization, conjugate gradients, etc.

Model m may be adapted to use a parabolic Radon model, in which case the exponential term in equation (6) becomes $qh^2$, i.e., $e^{-2\pi i f q h^2}$ instead of $e^{-2\pi i f p h}$, where q now relates to the parabolic moveout (s/m$^2$). Parabolic Radon is used extensively in seismic exploration for demultiple based on the parabolic or near parabolic moveout of primary and multiple energy after normal moveout correction. Herrmann P., Mojesky T., Magesan M., Hugonnet, P., [2000] Dealiased, high-resolution Radon transforms, 70th Annual SEG meeting, SP2.3 describes a scheme for using non-aliased low-frequency energy to constrain the high-frequency model for improved primary/multiple separation and better handling of aliased energy. Those skilled in the art would recognize that model m may further be adapted to use other types of transformations, for example, in the time domain, and function sets other than linear and parabolic may also be used.

According to an embodiment, an example of a model m is provided for bird noise removal that jointly determines models for seismic signal and coherent noise. Model m can include one or more models for the seismic data, and one or more models for each bird. An example of such a model m for two birds may be expressed as follows:

$$\begin{pmatrix} d_1 \\ d_2 \\ d_N \end{pmatrix} = \begin{pmatrix} e^{-2\pi i f p h} & e^{-2\pi i f p |a-a^{b1}|} & e^{-2\pi i f p |a-a^{b2}|} \end{pmatrix} \begin{pmatrix} m_1^{ss} \\ m_2^{ss} \\ m_3^{ss} \\ m_M^{ss} \\ m_1^{b1} \\ m_2^{b1} \\ m_O^{b1} \\ m_1^{b2} \\ m_2^{b2} \\ m_P^{b2} \end{pmatrix}. \quad (7)$$

In equation (7), the right-hand vector contains three models $m^{ss}$, $m^{b1}$ and $m^{b2}$, all of which contribute to the modelling of each data trace. The $m^{ss}$ terms relate to the model for the pure seismic signal ss, the $m^{b1}$ terms relate to the model for bird 1, and the $m^{b2}$ terms relate to the model for bird 2. The L matrix terms corresponding to the pure seismic signal model, $e^{-\pi i f p h}$, contain slowness terms p (s/m) relating to the relevant model trace and source-receiver offset terms h (m) relating to the relevant data trace as before. The matrix terms for the noise models contain the absolute difference in the position along the streamer between the trace and the bird, where a is the position of the receiver along the streamer, $a^{b1}$ is the position of bird 1, and $a^{b2}$ is the position of bird 2. By using the absolute difference in position in this way ensures the noise response relating to each bird will be symmetrical. In addition, it should be noted that different positioning schemes have been used for the pure seismic signal and coherent noise model derivations. The model for the pure seismic signal uses the source-receiver offset which may be based on 2D or 3D offsets, based on the propagation of energy from source to receiver. The model for the coherent noise is based on the propagation of the noise along the streamer. With other noise propagation, different distance reference schemes may be used. In some cases, models for pure seismic signal and noise may both use the source-receiver offset, h. The slowness terms, p, in the model equation relates to the slowness of the relevant model trace. Note that the slowness values for the noise models $m^{b1}$ and $m^{b2}$ need only contain positive values (because the energy always travels away from the bird) for a distinct slowness range based on measured velocity. The bird positions may be known from the streamer deployment and positioning equipment or may be calculated through examination of the data. In addition, the model spaces may contain different slowness ranges relating to the range of dips anticipated for pure seismic signal and noise. For example, the noise may be travelling along the cable much more slowly (e.g. ~10 to 100 m/s) than the apparent propagation velocity of the pressure wavefield travelling in the water (e.g., 1480 m/s or higher). The reverse transform of noise models may be modified to model the dispersive propagation of the noise. The dispersion may be modelled based on the Euler-Bernulli, Rayleigh, or another equation.

Figure 4:
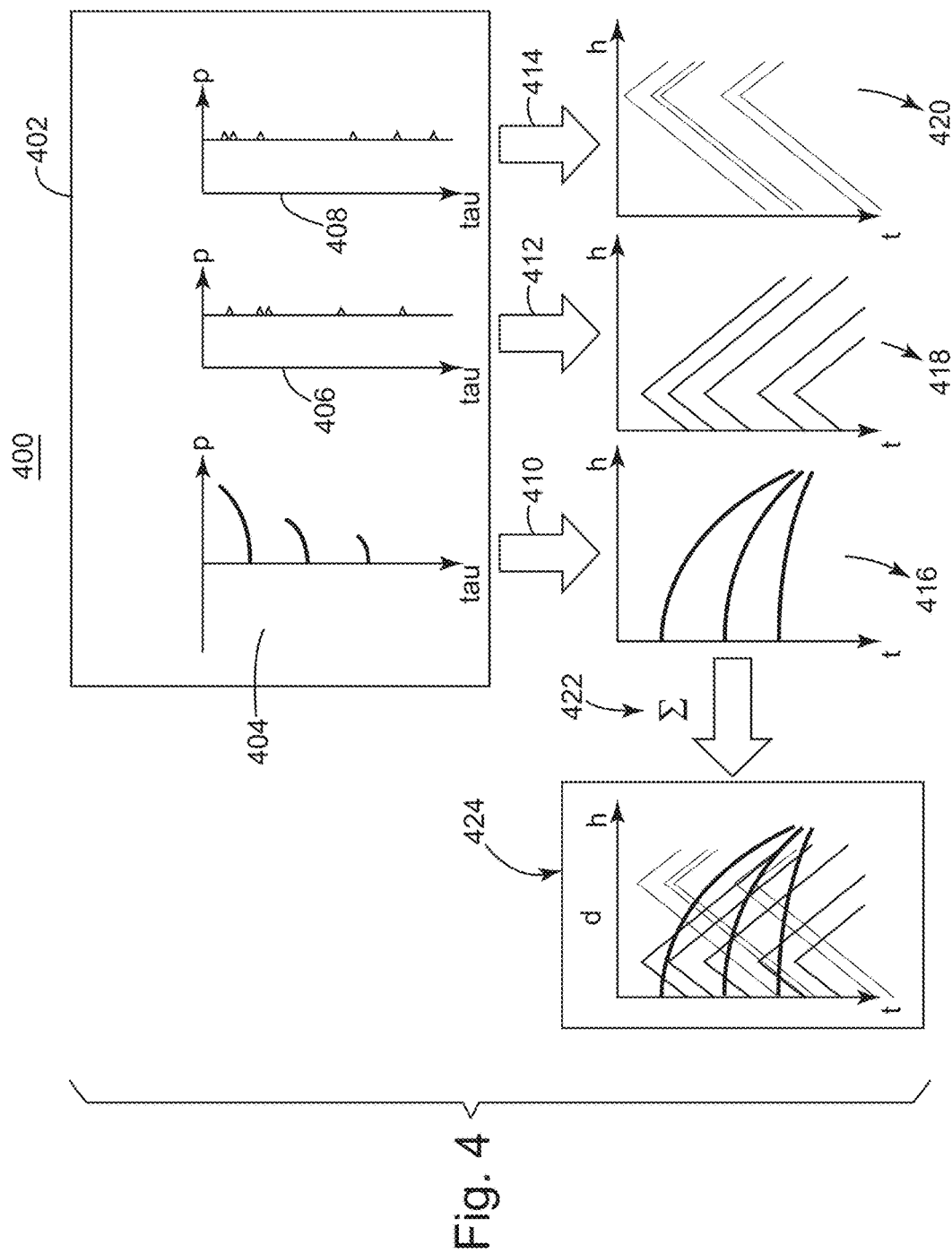
FIG. 4 illustrates how a model m is used to remove the coherent noise from recorded data.

FIG. 4 illustrates the various sub-models contained by model m and how they reverse transform and combine to reconstruct the known input seismic data d. More specifically, FIG. 4 illustrates process 400 in which model m 402 includes a sub-model 404 for the pure seismic signal $m^{ss}$, a sub-model $m^{b1}$ 406 for bird 1, and a sub-model $m^{b2}$ 408 for bird 2. More bird models may be used up to the number of actual birds attached to the streamers. Further sub-models may be included in model m to account for other man-made devices, e.g., paravanes, diverters, etc.

The sub-models may be found simultaneously by inversion and may include sparseness weighting to improve resolution, avoid problems relating to aliasing, and to separate signal and noise. Once the sub-models have been found (because the L transform and the input data d are known), the noise sub-models may be multiplied by L' (which is obtained from L by blanking the top part of the matrix relating to the pure seismic signal model) to generate a noise estimate. The noise estimate may then be subtracted from input data d. For example, still with reference to FIG. 4, a transform $L_{ss}$ 410 that blanks the $e^{-2\pi ifp|a-a^{b1}|}$ and $e^{-2\pi ifp|a-a^{b2}|}$ terms generates output seismic data ss 416 having reduced coherent noise, a transform $L_{bird1}$ 412 that blanks the data model part $e^{-2\pi ifph}$ and the terms associated with one of the bird models $e^{-2\pi ifp|a-a^{b2}|}$ generates noise data 418 associated with the first bird, and a transform $L_{bird2}$ 414 that blanks the data model part $e^{-2\pi ifph}$ and the terms associated with the other one of the bird models $e^{-2\pi ifp|a-a^{b1}|}$ generates noise data 420 associated with the second bird.

If the pure seismic signal estimate ss 416 is added to noise data 418 corresponding to the first bird and noise data 420 corresponding to the second bird as described by operation 422, measured seismic data d 424 is obtained (within numerical precision and inversion limits). To estimate overall noise, it is possible to multiply the noise sub-models with transforms $L_{bird1}$ and $L_{bird2}$. The resultant noise estimate may then be subtracted from input data d to obtain the seismic data with reduced noise d'. Some energy will not be modelled by any of the models and, thus, this energy may be termed residual noise.

In one embodiment, the noise amplitude may decay with distance when moving away from the bird. This phenomenon may be accounted for in matrix L by multiplying the columns of the matrix by relevant decay terms. One such example is given by:

$$\begin{pmatrix} d_1 \\ d_2 \\ d_N \end{pmatrix} = \begin{pmatrix} e^{-2\pi ifph} & W_1^{b1} e^{-2\pi ifp|a-a^{b1}|} & W_1^{b2} e^{-2\pi ifp|a-a^{b2}|} \end{pmatrix} \begin{pmatrix} m_1^{ss} \\ m_2^{ss} \\ m_3^{ss} \\ m_M^{ss} \\ m_1^{b1} \\ m_2^{b1} \\ m_O^{b1} \\ m_1^{b2} \\ m_2^{b2} \\ m_P^{b2} \end{pmatrix}, \quad (8)$$

where $W_i^{bj}$ is the decay term for trace i and man-made device j. The decay terms may be inversely proportional with a distance or a square of the distance from man-made devices or another decay based on the propagation properties of the streamer. As before, the equation may be modified to model a dispersion of the noise.

Equations (5) to (8) may be formulated and solved in a spectral domain (e.g., frequency, z-transform, Laplace, Walsh series, wavelet) or in the time domain. Sparseness weights may be derived to help distinguish between signal and noise. In the event there is a multi-component representation of data d, data sparseness weights may be derived from the clean component (e.g., hydrophone data) and used as a priori information for the derivation of the data and noise models on a noisier component, e.g., vertical particle motion.

In some embodiments the polarity of the noise may vary depending on the position of the sensor relative to the noise source (for example when a particle motion sensor oriented along the streamer is available). This feature may be included in matrix L by changing the sign of the weighting terms depending on the sign of quantities $a-a^{b1}$ and $a-a^{b2}$.

As the noise is assumed to be symmetric (as illustrated in FIG. 4 by data sets 418 and 420), equations (5) to (8) are well formulated and avoid modelling seismic signal in the noise model or modelling noise in the seismic signal model. This is further improved by the limited range of slowness for the noise models, and also by the possibility of deriving data sparseness weights from a component which does not contain the noise (where possible).

The bird positions may be known directly from acquisition data, or may be estimated by examining the recorded data. As discussed throughout this disclosure, the denoising method is not limited to the removal of bird noise, but may be used in other environments that exhibit noise of a similar character. One example is ground or mud roll attenuation. The method may be implemented in higher dimensions where necessary. Where relevant, the equations may be modified to include the description of dispersive or back-scattered noise, which can be a problem.

Input seismic data d may include only pressure measurements, or only particle motion measurements, or both pressure and particle motion measurements. The first domain may be a time-space domain, while the second domain may be one of a Radon domain (hyperbolic, parabolic, etc.), frequency-wave number domain, tau-p domain, rank reduction, singular value decomposition (SVD), and curvelet domain. A combination of model types may be selected in order to most accurately describe and separate seismic signal and noise. For example, a linear tau-p model may be used for the noise model, and a parabolic model for the pure seismic signal. In one application, the step of generating a model m includes solving an inverse problem based on linear operator L and input seismic data d, and applying an L' transform to model m to obtain a seismic dataset with reduced noise. Model domain m may also be processed to include interpolation, deghosting, muting, scaling, resampling, removing cross-talk or interference noise, redatuming, obliquity correction and vector rotation.

Figure 5:
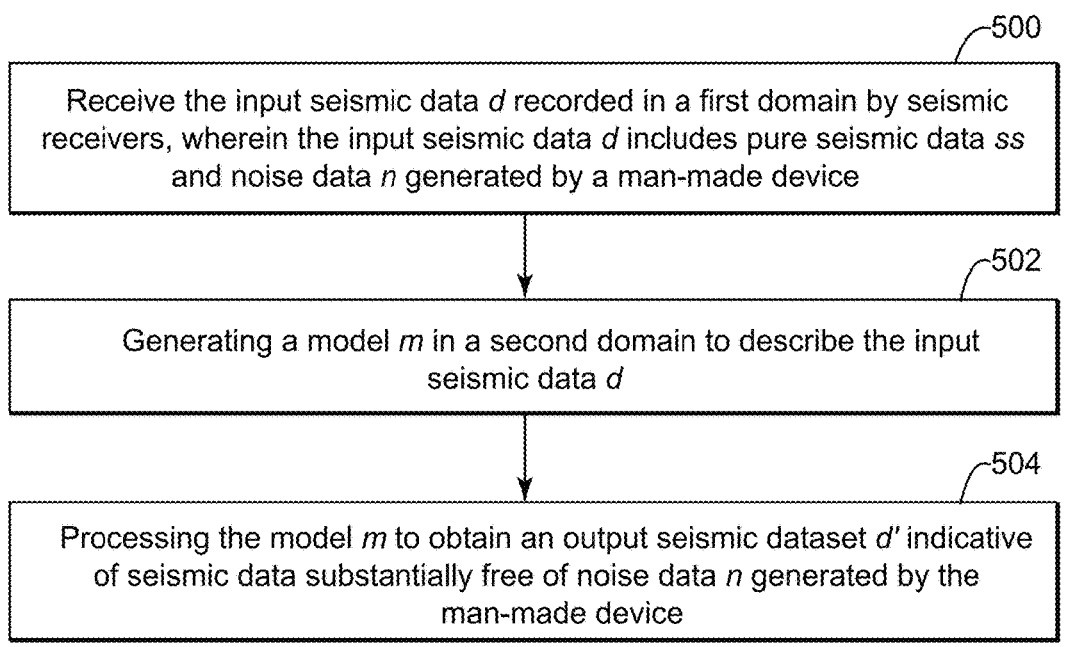
FIG. 5 is a flowchart of a method for removing noise from recorded seismic data.

According to another embodiment, there is a method for denoising input seismic data d. The method includes, as illustrated in FIG. 5, a step 500 of receiving input seismic data d recorded in a first domain by seismic receivers, wherein input seismic data d includes pure seismic data ss and noise data n generated by a man-made device, a step 502 of generating a model m in a second domain to describe input seismic data d, and a step 504 of processing model m to obtain an output seismic dataset d' indicative of seismic data substantially free of noise data n generated by the man-made device.

The step of generating may include jointly and simultaneously deriving the terms associated with seismic data d and the terms associated with the man-made device. The step of processing may include computing model m by solving an inverse problem based on an L transform; and applying an L' transform to model m to obtain output seismic dataset d'. Alternatively, the step of processing may include computing model m by solving an inverse problem based on an L transform; applying an L' transform to model m to obtain noise data n; and subtracting noise data n from input seismic data d to obtain output seismic dataset d'. The method may further include generating an image of a surveyed subsurface based on output seismic dataset d'.

The above embodiments were discussed without specifying what types of streamers are used to record the seismic data. In this sense, it is known in the art to use streamers that may be horizontal or slanted or have a curved profile as illustrated in FIG. 6.

Figure 6:
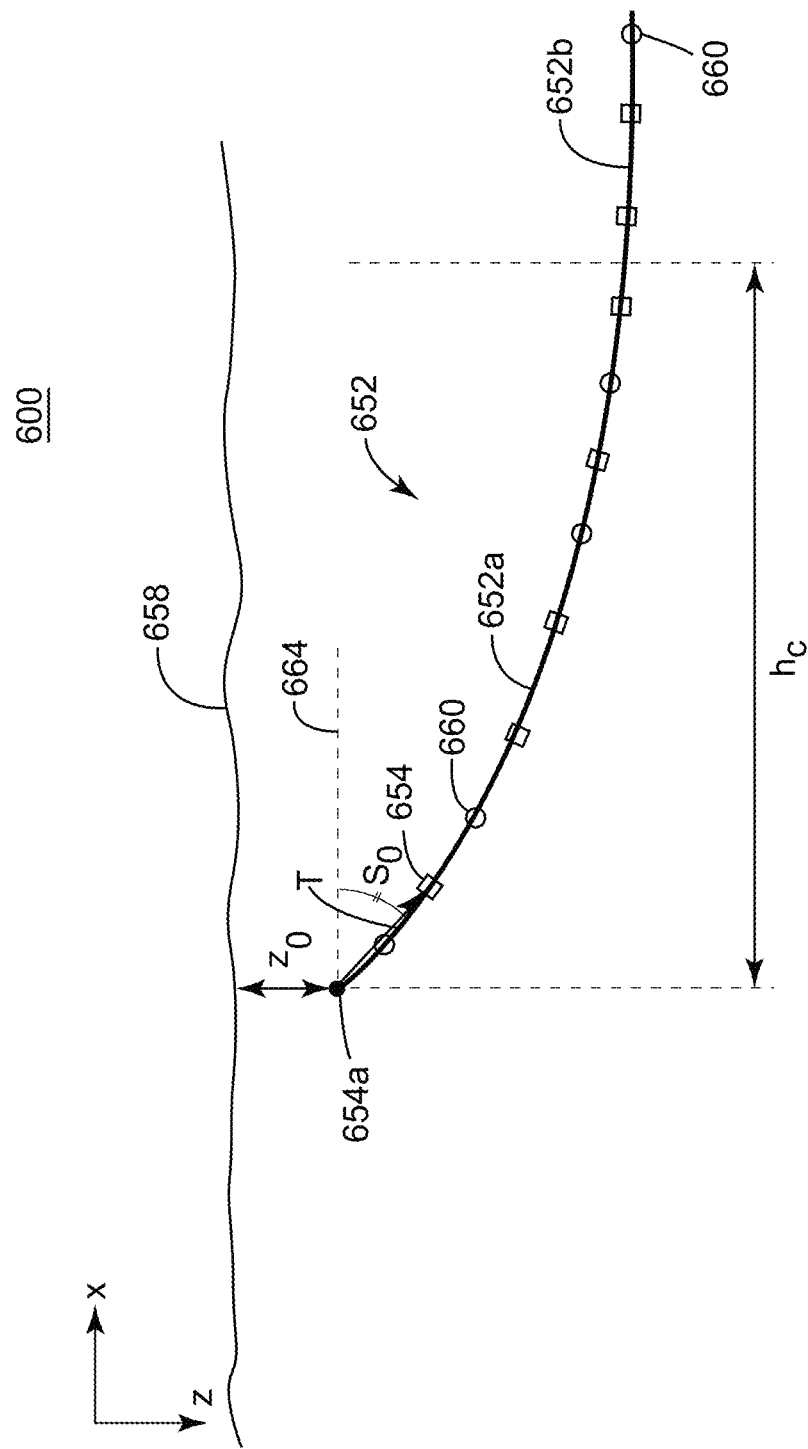
FIG. 6 is a schematic diagram of a curved streamer.

The curved streamer 600 of FIG. 6 includes a body 652 having a predetermined length, plural detectors 660 provided along the body, and plural birds 654 provided along the body for maintaining the selected curved profile. The streamer is configured to flow underwater when towed so that the plural detectors are distributed along the curved profile. The curved profile may be described by a parameterized curve, e.g., a curve described by (i) a depth $z_0$ of a first detector (measured from the water surface 658), (ii) a slope $s_0$ of a first portion T of the body with an axis 664 parallel with the water surface 658, and (iii) a predetermined horizontal distance $h_c$ between the first detector and an end of the curved profile. Note that not the entire streamer has to have the curved profile. In other words, the curved profile should not be construed to always apply to the entire length of the streamer. While this situation is possible, the curved profile may be applied only to a portion 652a of the streamer. In other words, the streamer may have (i) only a portion 652a having the curved profile or (ii) a portion 652a having the curved profile and a portion 652b having a flat profile, the two portions being attached to each other.

Figure 7:
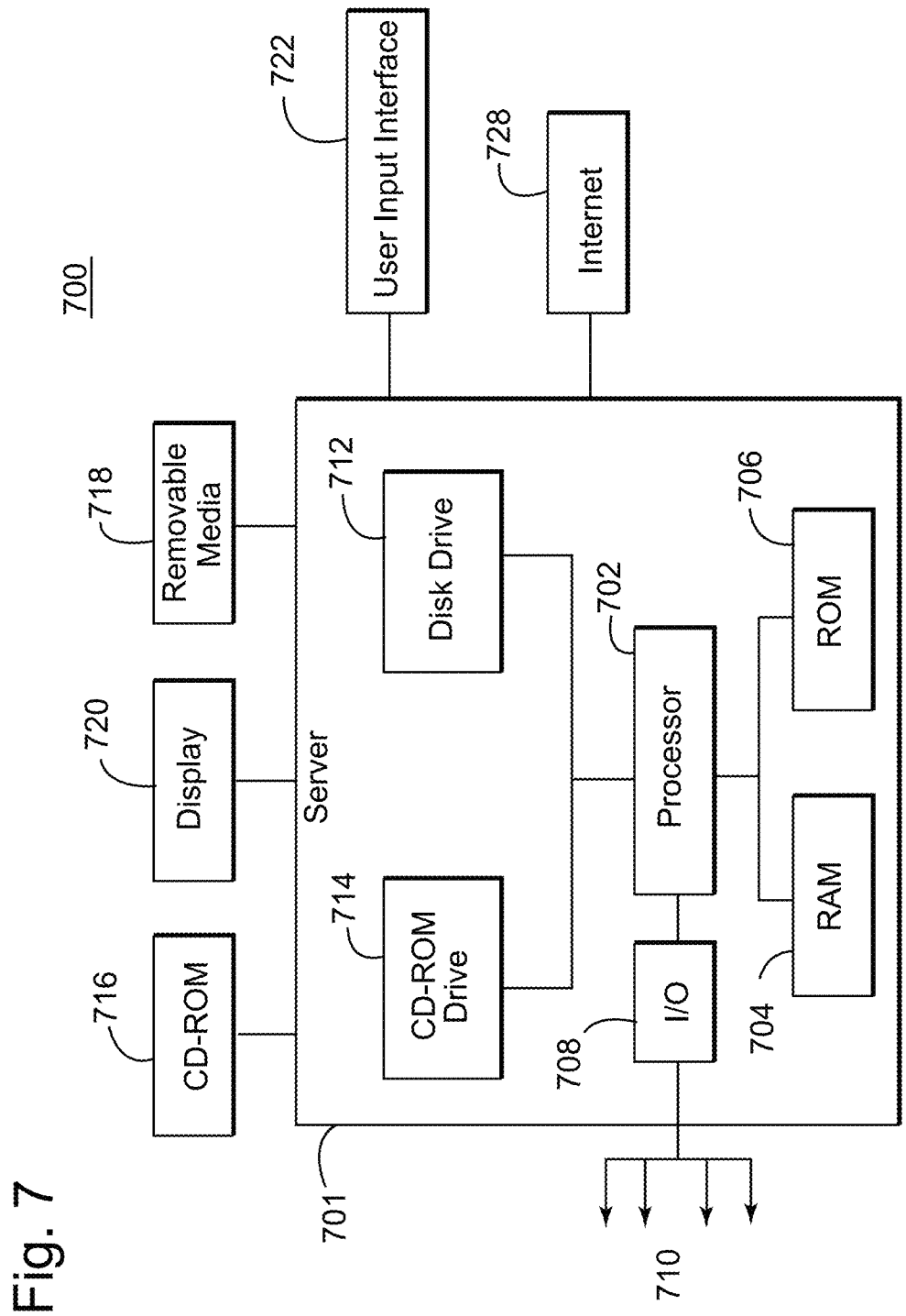
FIG. 7 is a schematic diagram of a control device that can implement a method for removing coherent noise from recorded seismic data.

The above-discussed procedures and methods may be implemented in a computing device as illustrated in FIG. 7. Hardware, firmware, software or a combination thereof may be used to perform the various steps and operations described herein. Computing device 700 of FIG. 7 is an exemplary computing structure that may be used in connection with such a system.

Exemplary computing device 700 suitable for performing the activities described in the exemplary embodiments may include a server 701. Such a server 701 may include a central processor (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/output (I/O) circuitry 708 and bussing 710 to provide control signals and the like. Processor 702 carries out a variety of functions as are known in the art, as dictated by software and/or firmware instructions.

Server 701 may also include one or more data storage devices, including hard drives 712, CD-ROM drives 714 and other hardware capable of reading and/or storing information, such as DVD, etc. In one embodiment, software for carrying out the above-discussed steps may be stored and distributed on a CD-ROM or DVD 716, a USB storage device 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tube (CRT), etc. A user input interface 722 is provided, including one or more user interface mechanisms such as a mouse, keyboard, microphone, touchpad, touch screen, voice-recognition system, etc.

Server 701 may be coupled to other devices, such as sources, detectors, etc. The server may be part of a larger network configuration as in a global area network (GAN) such as the Internet 728, which allows ultimate connection to various landline and/or mobile computing devices.

Data Interpolation and/or Denoise Constrained with Multi-Datasets

The embodiments discussed above have addressed the removal/reduction of noise produced by man-made devices, which might be used during a marine seismic survey, e.g., a bird. However, other noise categories may be present during a marine seismic survey, as now discussed. For these categories, other methods may be used for denoising the data. In one or more embodiments, methods for interpolating the data with or without denoising are also discussed. Further, some of the embodiments will address a novel method for calculating dip maps, which are used for data interpolation or regularization of collected seismic data.

The source and receiver coordinates associated with the collected seismic data are often not on the desired locations for a number of reasons. For example, for a marine seismic dataset, this may be the case due to cable feather (i.e., the streamer making an angle with the pre-plot position due to, e.g., ocean currents) or inaccurate source positioning. Cable feather may be in the range +/−2 degrees for many acquisitions, but in extreme cases, feather up to 25 degrees may be experienced. For a land seismic dataset, the positioning of sources and receivers can be limited by obstructions or terrain, human error, etc.

With time-lapse seismic surveying (i.e., 4-dimensional (4D) surveys), two or more surveys are taken at different times and compared to each other in an attempt to analyse changes at the reservoir level relating to oil extraction and fluid/gas injection. The first in time survey is called base and any later in time survey is called a monitor or alternatively a later vintage. A 4D survey includes one base and any number of monitors. Ideally, the shot and receiver sampling for all 3D surveys of the 4D survey should be located at the same locations to minimise undesirable differences between the surveys. In other words, when a comparison is made between a base and a monitor or between two monitors, it is desirable to have the sources and receivers distributed at the same locations in both surveys. With the same sampling, the energy will take the same path through the Earth, with the exception of small changes in the reservoir, which is the objective of seismic survey.

One way to reduce the difference in sampling between seismic datasets is to apply data regularisation or interpolation/mapping. With data regularisation, the process attempts to reconstruct the seismic traces (recordings of the receivers) at bin centre and with higher dimensions offset class center and/or azimuth sector. In this case, the output data will be regularly sampled in at least one direction. Note that in higher dimensions, other dimensional sets may be used, e.g., inline-crossline-offsetx-offsety, or shotx-shoty-receiverx-receivery. The bin concept is explained, for example, in U.S. Patent Publication No. US 2014/0029379, the entire content of which is included herein by reference. An offset class center refers to the offset coordinates used for the seismic data, for example, for a 3D seismic survey, this is the Euclidean distance between the receiver and the source.

In the case of data mapping, one of the datasets may be output on the sampling positions of the other dataset. An alternative scheme would be to move both sets of data to intermediate positions, for example, in between the sampling of base and monitor. In general, the aim of data regularization or interpolation/mapping is to harmonize the sampling of the datasets so as to minimise the difference in wavefield propagation in order to minimize unwanted noise on the time-lapse difference section.

In one embodiment, when the datasets are recorded on different datums, for example, towed streamer datasets with different tow depths or towed streamer and ocean bottom survey, it may be of benefit to interpolate the recorded traces to positions that repeat the illumination at the target level. This could be achieved by ray-tracing through a velocity model down to the target level, and interpolating traces so as to repeat the illumination as consistently as possible.

There are various methods to interpolate irregular data. Generally, these methods fall into two categories, those that rely on filters and those that derive a continuous model of the data. The embodiments to be discussed next relate to the model-based data interpolation methods, which may include high resolution Radon (linear, parabolic, hyperbolic, etc), curvelet, contourlet, ridgelet, projection onto convex sets (POCS), anti-leakage transform (Fourier, linear, parabolic, etc), or other processes. The anti-leakage Fourier transform has a specific definition, as disclosed, for example, in Xu, S., Y. Zhang, D. Pham, and G. Lambaré, 2005, Antileakage Fourier transform for seismic data regularization: Geophysics, 70, no. 4, V87-V95, the entire content of which is incorporated herein by reference. However, this term is used herein to describe a group of methods which may derive a continuous representation of the input data in one or more spatial dimensions, by decomposing the model domain element by element, the response of each element being subtracted from the input data before further elements are derived. Methods in this group are sometimes called matching pursuit, data cleaning, or steered decomposition methods. However, those skilled in the art would recognize that the inventive concepts may be applied to other methods or group of methods. The input seismic data may be in any domain, for example, the offset domain, inline-crossline domain, inline-crossline-offset domain, inline-crossline-offset-azimuth domain, or any mixture of any number of spatial domains.

According to an embodiment, one particular implementation of the anti-leakage Fourier transform is described with reference to FIG. 8. In step 800, the seismic data from a single survey (either base or monitor) is received. In step 802 (space-time data corresponding to this step is illustrated in FIG. 9A), optionally, the received input data is windowed in a spatio-temporal domain with or without normal moveout (NMO) correction. The NMO correction is a process known in the art and for this reason, its description is omitted herein.

Next, the input seismic data is transformed from the time-space domain to another domain for processing. In this embodiment, the data is transformed to the frequency-wavenumber domain. However, other domains may be used as will be recognized by those skilled in the art. Because the input data is regular in time but irregular in space, the transformation happens in two steps. In step 804, the input data is transformed from the time-space domain to a spectral domain in the time direction, using a Fast Fourier Transform (FFT), i.e., from the t-x domain to the f-x domain. In step 806, the transformed data is further transformed using a spatial irregular Fourier transform from the frequency-space domain to the frequency-wavenumber domain, e.g., from f-x to f-k, for a given bandwidth, either non-aliased and/or of good signal to noise ratio. In 2D, a possible equation for this process is:

$$f(k) = \sum_{n=1}^{N} w(n)d(n)e^{-2\pi i k x(n)},$$

where:
N—Number of traces in the window,
f(k)—Spatial Fourier transform for wavenumber k,
w(n)—Integration weight for trace n,
d(n)—Data traces, and
x(n)—Spatial position of traces, normalised to the range 0 to 1.

For regular data the minimum and maximum wavenumbers for this decomposition are normally defined based on aliasing. For irregular data, there is not a strict aliasing pattern and it may decompose up to higher wavenumbers. In practice, the maximum wavenumber may be defined based on the maximum dip and maximum frequency for the data.

The integration weights may be formulated in many ways, one of which is as follows:

$$w(n) = \frac{x(n+1) - x(n-1)}{2}.$$

This principle is outlined in FIG. 10 and may be extended to two or more spatial dimensions with Voronoi tessellation or other schemes. FIG. 10 shows an amplitude on the y axis represented over the spatial position x of the traces.

In step 808, the amplitude spectrum of the data in the frequency-wavenumber domain is calculated, where the amplitude spectrum is related to the amplitude of the energy of the seismic data (see FIG. 9B). Note that power spectra or other representations may also be used. In step 810, the amplitude spectrum is transformed from f-k domain to the frequency-slowness domain, i.e., f-p domain, where p is the slowness (s/m). This transformation involves looping round all the f-p domain values intended to be constructed, calculating the equivalent wavenumber relating to the frequency and slowness (Wavenumber (m$^{-1}$)=Slowness (s/m)*Frequency (s$^{-1}$)), and estimating the value at the given wavenumber using linear interpolation of the f-k data. In step 812, the f-p amplitude data are then summed for each slowness (p) trace to calculate the 'dip map', i.e., a map of the dips (inclined features) of the surveyed subsurface for the given window (represented in FIG. 9C). For example, it is possible to take the average amplitude for each slowness of interest for generating the dip map. Alternatively, the slant stack may be taken to transform windowed data (804) directly to the f-p domain using the following expression:

$$f(p) = \sum_{n=1}^{N} w(n)d(n)e^{-2\pi i s(p)x(n)}$$

where s(p) is the slowness for a given p in s/m.

The amplitude spectrum may then be computed directly in the f-p domain following which it is averaged to make the dip map.

In step 814, the dip map (represented in FIG. 9C) is propagated to all temporal frequencies (represented in FIG.

9D as frequency versus wavenumber data) in order to determine a wavenumber decomposition order (816) for each temporal frequency. This propagation uses the reverse of the f-k to f-p transform described earlier. This means that each time a wavenumber from 804 is decomposed, its effect will be subtracted from the input data (as in the anti-leakage Fourier transform). This approach reduces spectral leakage and results in a sparse representation of the data (see step 818 in FIG. 8 and data in the frequency-wavenumber in FIG. 9E). It can be seen that the data after this process (FIG. 9E) is much cleaner and sharper than the original FK domain data (FIG. 9B) with less noise.

In step 820, the continuous representation of the data is used to reconstruct the energy (see FIG. 9F) at the required locations, either regular or irregular. After one or more processing steps 822 which are known in the art, in step 824 a final image of the surveyed area may be generated. The processing step 822 may include one or more pre-processing methods, e.g., demultiple, signature deconvolution, trace summing, motion correction, vibroseis correlation, resampling, etc., one or more of main processing methods, e.g., deconvolution, amplitude analysis, statics determination, common middle point gathering, velocity analysis, normal move-out correction, muting, trace equalization, stacking, noise rejection, amplitude equalization, etc., and one or more of final or post-processing methods, e.g. migration, wavelet processing, seismic attribute estimation, inversion, etc.

Figure 8:
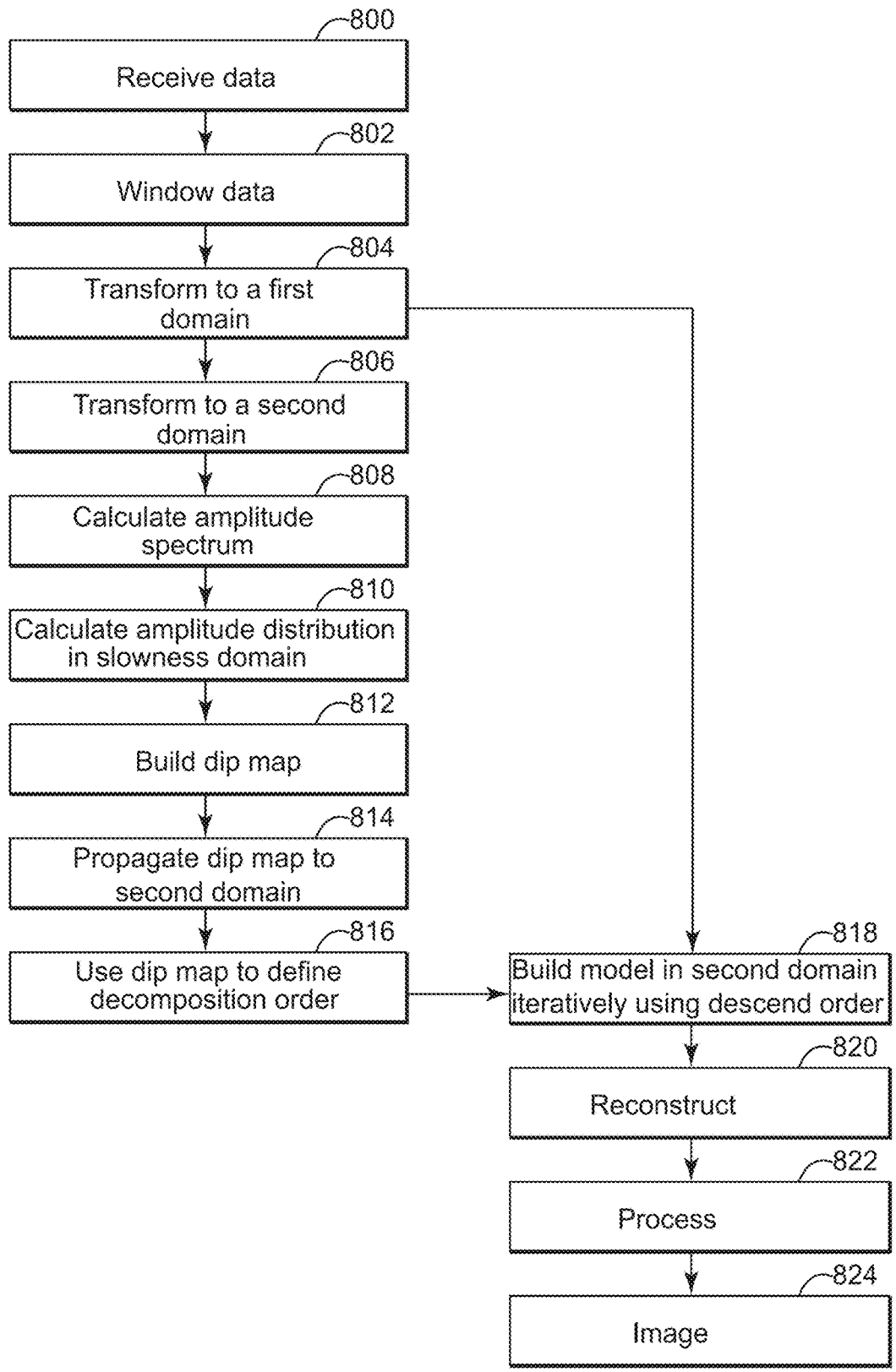
FIG. 8 is a flowchart of a method for calculating a dip map based on an anti-leakage Fourier transform.

However, a deficiency of the method discussed with regard to FIG. 8 is the possible limitations imposed by the dip map. This means that if the seismic data associated with a survey is not of high quality, the dip map will be poor and the mapped or reconstructed or regularized energy will be poor.

This weakness of the method may be fixed as now discussed. In the case of data reconstruction for a time-lapse project (i.e., 4D survey), more than one dataset is available, e.g., baseline survey and monitor survey. This means that for a given spatial processing block, it is possible to calculate one dip map for the baseline survey, and another dip map (i.e., the dip map calculated in step 812 above) for the monitor survey. For a consistent spatio-temporal window, the dip maps should be similar, but based on different noise levels and spatial sampling associated with the baseline and monitor surveys, the two dip maps vary, which in turn produce different decomposition orders (i.e., the results of step 814). This diversity of the decomposition orders results in an inconsistency in the spatial Fourier decomposition and subsequent interpolation results.

Thus, to improve the results of data regularization and/or interpolation, according to an embodiment, the dip maps are stabilized by using more than one seismic dataset. While the method of FIG. 8 used a single seismic data set (either base or monitor) to generate a single dip map, in the case of time-lapse projects, a single reference dip map is calculated for both the base and monitor surveys. Although the reference dip map is discussed based on time-lapse projects, the methodology to be discussed now may be generalized, as described later, to plural surveys that do not form a 4D survey.

According to this embodiment, a single reference dip map for two or more different seismic surveys (datasets) may be calculated based on the following exemplary approaches:
1. Use the data from both base and monitor datasets;
2. Use data from all surveys of a multi-vintage, time-lapse project;
3. Use data with the best sampling;
4. Use data with the highest signal-to-noise ratio; and
5. Calculate dip maps for each dataset and combine them through a weighted summation, or another method that uses data from more than one survey.

The calculated single reference dip map is then used for all sets of data and it will dictate the same decomposition order for the datasets and hence, the result is a more consistent regularization or data interpolation, leading to a reduction in noise of the time-lapse difference section. Note that in one embodiment, the surveyed area is broken into plural cubes and the data is regularized for each cube, with a single reference dip map per cube, calculated based on one of the approaches discussed above. Thus, in this embodiment, the single reference dip map changes from cube to cube across the surveyed area.

According to another embodiment, instead of sharing a single reference dip map for both datasets, it can be desirable to have a different reference dip map for each vintage, but the respective reference dip map is biased towards another dataset. For example, consider two datasets $d_1$ and $d_2$ and two corresponding dip maps, $dm_1$ and $dm_2$, each dip map calculated based on the method discussed above with reference to FIG. 8. The average dip map is $(dm_1+dm_2)/2$, which can be used as the single reference dip map for both datasets. However, an alternative may be to use the combination $2dm_1/3+dm_2/3$ for the first survey and combination $2dm_2/3+dm_1/3$ for the second survey. Note that the surveys do not have to share a unique dip map, but the reference dip map used for each survey is partly constrained by the other dataset or, in the case of multi-vintage, by the other datasets.

As discussed above, the spatial Fourier transform of irregular data leads to spectral leakage noise in the resulting FK domain. The FK domain data is used to construct a first dip map which in turn may contain a level of noise relating to the spectral leakage noise. In one embodiment, a dataset is independently reconstructed at new locations using the first dip map. The locations may be regularly or irregularly sampled. This independently reconstructed dataset may then be used to generate a second dip map to use for further data reconstruction, either for the same dataset or relating to another dataset. The second dip map may be cleaner than the first dip map (especially if regular sampling was used) and therefore be a better reference for the iterative anti-leakage Fourier decomposition procedure. In one embodiment the process is applied iteratively to a single dataset, each time the new dip map will be cleaner than the last, resulting in an improved interpolation of the original irregular dataset. The iteratively calculated dip map may also be used for reconstruction of one or more datasets as described previously.

In another embodiment, data relating to more than one dataset may be input simultaneously to an irregular spatial Fourier transform. The result of this irregular Fourier transform does not relate uniquely to any of the individual datasets and hence may be termed a multi-dataset irregular Fourier transform. This multi-dataset irregular Fourier transform may then be used to derive a reference dip map which may then be used to derive the anti-leakage Fourier decomposition order for each individual dataset. As discussed before, this dip map may be used on its own or combined with other dip maps as required.

In other words, according to an embodiment, a reference dip map for a given dataset is selected/calculated based on the given dataset but also based on at least another dataset, different from the given dataset, so that the calculated reference dip map is constrained by two or more datasets. According to this approach, consistent wavenumber decomposition for the interpolation of both datasets is achieved.

Figure 11:
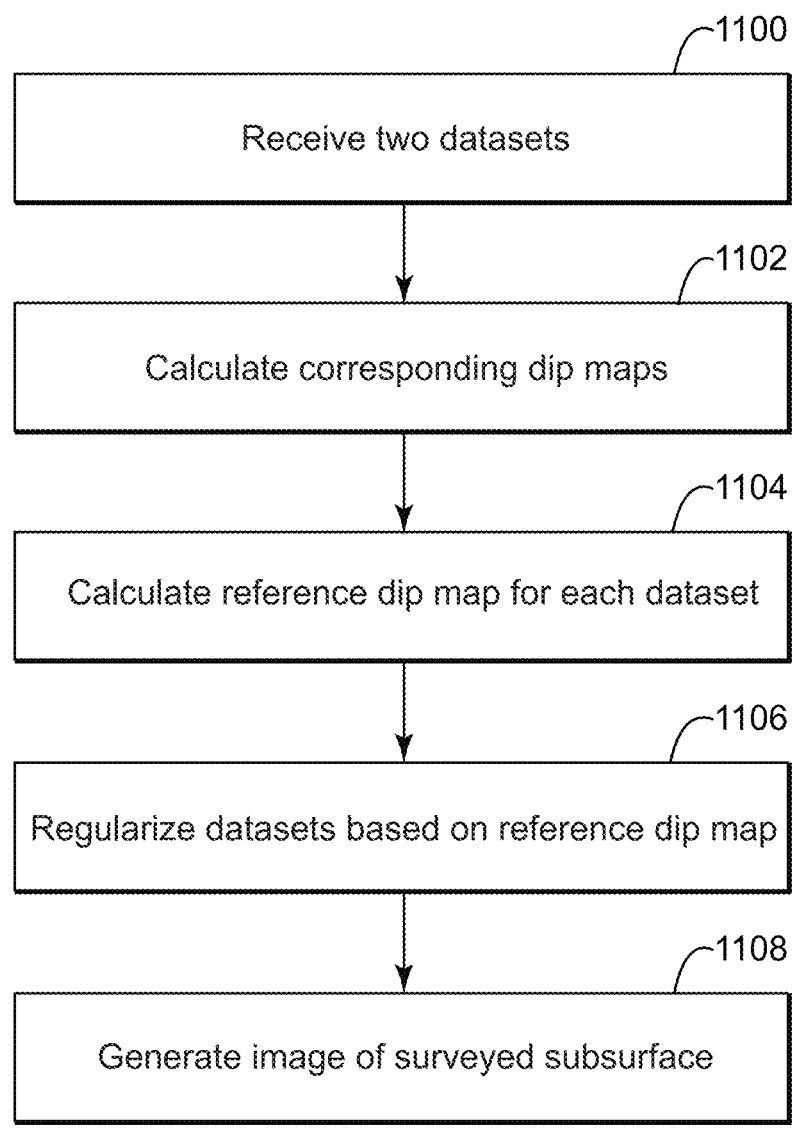
FIG. 11 is a flowchart of a method for generating an image of a subsurface based on seismic data.

This method is now illustrated with respect to FIG. 11. In step 1100, two or more seismic datasets are received and in step 1102, corresponding dip maps are calculated, for each dataset, as discussed above with regard to FIG. 8. In step 1104, a reference dip map is calculated for each dataset. The reference dip map may be the same for all datasets. The reference dip map may be calculated as discussed above, i.e., taking into consideration one or more datasets (see examples (1) to (5) but also the average dip map or the dip map combination discussed above). The feature that characterizes the calculated reference dip map is that at least another dataset is used to constrain the calculation of the reference dip map. Then, in step 1106, the calculated reference dip map is used to regularize the datasets and in step 1108 an image of the surveyed subsurface is generated.

This method may be combined with a denoising step if the number of wavenumbers to be decomposed for each frequency is limited, or scale the spectral (f-k) amplitudes of at least one dataset. The scaling may be based on information from the other dataset.

According to another embodiment, it is possible to use the one or more dip maps calculated for a single monitor dataset for the base and monitor datasets (due to better sampling for example), except for an undershoot area which uses the dip map from the base survey. In other words, suppose that the base dataset was acquired for a given area that had no obstacles. Some time later, a new seismic survey using better sources and receivers is acquired over the same area, but this time, an obstacle, e.g., a rig, is present inside the area. This means that the monitor survey will acquire poor data where the obstacle is located, but better data everywhere else. Then, the dip maps from the monitor survey may be used for the base survey everywhere except the obstacle area, while one or more dip maps from the base survey are used for the base and monitor surveys for the obstacle area. This principle can be extended to vary the weighting scheme spatially based on localized sampling, e.g., feather. For example, it is possible to analyse the data sampling for each spatial window for each dataset, and decide the best weighting/combination scheme to derive the dip map. Alternatively, it is possible to try regularisation with various trial dip maps, and select the dip map combination which minimises the difference between the regularised datasets (for a timelapse project). The measure of the difference may be RMS error, NRMS (normalised RMS), or another measure. This procedure may be optimised by a scan of different weighting schemes, trial and error, or other non-linear optimisation scheme.

The process outlined above may be described as an improved iterative model decomposition method (e.g., anti-leakage style decomposition) using a decomposition order stabilized by at least one dataset other than a dataset being reconstructed. The following list gives some non-limiting examples of dataset types which may constrain each other:
(a) Base and monitor datasets from a time-lapse survey;
(b) Multi-vintage time lapse surveys;
(c) Adjacent offset volumes;
(d) Constrained decomposition of a pre-stack dataset (e.g., offset volume) with a stack of data;
(e) One azimuth direction with another azimuth direction;
(f) Shot or receiver gather with a stack of data;
(g) Pressure data and particle velocity data, e.g., from a multi-component streamer or ocean bottom station (OBS) survey; and
(h) Towed streamer and re-datumed OBS dataset.

The above is a non-exhaustive list of examples where more than one dataset is used to constrain a decomposition for an anti-leakage style regularisation, interpolation, or denoise algorithm.

The algorithms discussed above are applicable to all data types, i.e., land, OBS, and marine or any combinations thereof. The algorithms may also be used in one or more spatial dimensions. Any model domain may be used, examples include curvelet, ridgelet, SVD, rank reduction, tau-p, tau-q, f-k, hyperbolic, etc. Any of the methods discussed above may be implemented in a computer system, as for example, the one discussed with regard to FIG. 7.

While the above discussion has focussed on anti-leakage style decomposition, it should also be noted that the principle may be applied to other data reconstruction strategies. For example, the model domain derived using anti-leakage Fourier transform strategies may alternatively be derived using inversion. The inversion method would derive the FK domain such that when reverse transformed, the input data would be reconstructed as accurately as possible. One way to formulate this problem is using the l2 or least squares norm. While the least squares strategy will accurately describe the input data at the input positions, it may not be suitable for data reconstruction away from the input positions. For this reason, it is common to use iteratively re-weighted least squares, an example of which is given by Trad, D., Ulrych, T., and Sacchi, M., [2003], Latest views of the sparse Radon transform, Geophysics 68, 386-399. This may constitute solving an l1, Cauchy, or other norm solution. In the case there is more than one dataset, as discussed in this application, sparseness weights from a first dataset may be used to derive a model of a second dataset. The model of the second dataset may then be used for data reconstruction.

In one embodiment, a method for reconstructing data for a seismic dataset relating to a surveyed subsurface may be implemented as follows. The method includes a step of receiving a first seismic dataset; a step of calculating a function representative of event dips of the first seismic dataset; a step of receiving a second seismic dataset; a step of reconstructing data relating to the second seismic dataset using the function representative of the event dips of the first seismic dataset; and a step of generating an image of the surveyed subsurface based on the reconstructed data.

The reconstructed data may be at the same positions as input traces or at different positions then the input traces. In one application, the reconstructed data has a reduced noise level compared to the input. In one optional step, a model representation of the second seismic dataset is used to reconstruct data. If this step is implemented, the model representative of the second seismic dataset is calculated using an anti-leakage transform and a decomposition order is influenced by the function representative of the event dips of the first seismic dataset. In one application, the model representative of the second seismic dataset is derived by a weighted inversion scheme based on the function representative of the event dips.

In another optional step, the function is a reference dip map. The reference dip map may be the same for first and second seismic datasets or it may be different from a seismic dataset to another seismic dataset. In one application, the reference dip map is calculated based on data from both the first and second seismic datasets. The first and second seismic datasets may belong to a multi-vintage time-lapse project.

In another embodiment, the reference dip map is calculated based on a dataset having the best sampling among the first and second seismic datasets. In still another embodiment, the reference dip map is calculated based on a dataset having the highest signal-to-noise ratio among the first and second seismic datasets. In yet another embodiment, the reference dip map is calculated based on dip maps calculated for each dataset of the first and second seismic datasets. In one application, the dip maps are combined through a weighted summation.

In yet another embodiment, the reference dip map is calculated as an average of the dip maps of the first and second seismic datasets. It is also possible to have the reference dip map biased toward one of the first and second seismic datasets. If this is the case, the reference dip map for one of the first and second seismic datasets is given by a combination $(n-x)dm_1/n+xdm_2/n$ and the reference dip map for another of the first and second seismic datasets is given by a combination $(n-x)dm_2/n+xdm_1/n$, where n and x are natural numbers, and x is smaller than n.

Alternatively, it is possible to use the reference dip map for the first and second seismic datasets to obtain the same decomposition order for the datasets. In one application, the processing includes regularizing both the first and second seismic datasets based on the calculated reference dip map. An optional step includes denoising the first and second seismic datasets if the number of wavenumbers to be decomposed for each frequency is limited, or denoising the first and second seismic datasets by scaling spectral amplitudes of one dataset based on information from the other dataset.

The first and second seismic datasets may correspond to (a) base and monitor datasets from a timelapse survey, (b) multi-vintage time-lapse surveys, (c) adjacent offset volumes, (d) constrained decomposition of a pre-stack dataset and a stack of data, (e) one azimuth direction with another azimuth direction, (f) a shot gather or receiver gather and a stack of data; (g) pressure data and particle velocity data, and (h) towed streamer data and re-datumed ocean bottom cable dataset.

In one application, the first and second seismic datasets are related to land, marine, ocean bottom survey or transition zone seismic data. All these features discussed above may be combined in any way and/or order. They also may be implemented in a computing device and/or in a non-transitory computer readable medium that includes computer executable instructions for reconstructing data for a seismic dataset relating to a surveyed subsurface.

The disclosed exemplary embodiments provide a computing device, a method and computer instructions for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for denoising input seismic data d, the method comprising:
    receiving the input seismic data d recorded in a first domain by seismic receivers, wherein the input seismic data d includes pure seismic data ss relating to an exploration source and coherent noise data n generated by a man-made device;
    generating a vector model m as a vector in a second domain, which is different from the first domain, to describe the input seismic data d, wherein the vector model m includes a first sub-model for the pure seismic data ss and a second sub-model for the man-made device; and
    processing the vector model m to obtain an output seismic dataset d' indicative of seismic data substantially free of the coherent noise data n generated by the man-made device.

2. The method of claim 1, wherein the vector model m further includes a third sub-model associated with another man-made device.

3. The method of claim 2, wherein the step of generating includes jointly and simultaneously deriving the first sub-model associated with the pure seismic data and the second and third sub-models associated with the man-made device and the another man-made device.

4. The method of claim 1, wherein the step of processing comprises:
    computing the model m by solving an inverse problem based on an L transform; and
    applying an L' transform to the model m to obtain the output seismic dataset d'.

5. The method of claim 1, wherein the step of processing comprises:
    computing the model m by solving an inverse problem based on an L transform;
    applying an L' transform to the model m to obtain the noise data n; and
    subtracting the noise data n from the input seismic data d to obtain the output seismic dataset d'.

6. The method of claim 1, further comprising:
    generating an image of a surveyed subsurface based on the output seismic dataset d'.

7. The method of claim 1, wherein the first domain is a time-space domain.

8. The method of claim 1, wherein the second domain is one of a radon domain, frequency-wave number domain, tau-p domain, parabolic domain, shifted hyperbola domain, singular value decomposition domain, rank reduction domain and curvelet domain.

9. The method of claim 1, wherein the man-made device is one of a streamer bird, paravane, diverter, tail buoy or streamer steering device.

10. The method of claim 1, wherein the noise data n is symmetric relative to a temporal axis.

11. The method of claim 1, wherein the step of processing comprises:
    computing the model m by solving an inverse problem based on an L transform,
    wherein the L transform includes exponential terms.

12. The method of claim 11, wherein exponential terms corresponding to the man-made device have an exponent that is proportional to a distance between the location of the man-made device and a receiver responsible for recording a corresponding trace.

13. The method of claim 1, wherein the input seismic data d includes only pressure measurements, or only particle motion measurements, or a combination of pressure measurements and particle motion measurements.

14. A computing device for denoising input seismic data d, the computing device comprising:
   an interface for receiving the input seismic data d recorded in a first domain by seismic receivers, wherein the input seismic data d includes pure seismic data ss relating to an exploration source and coherent noise data n generated by a man-made device; and
   a processor connected to the interface and configured to,
   generate a vector model m as a vector in a second domain, which is different from the first domain, to describe the input seismic data d, wherein the vector model m includes a first sub-model for the pure seismic data ss and a second sub-model for the man-made device, and
   process the vector model m to obtain an output seismic dataset d' indicative of seismic data substantially free of the coherent noise data n generated by the man-made device.

15. The computing device of claim 14, wherein the vector model m further includes a third sub-model associated with another man-made device.

16. The computing device of claim 15, wherein the processor is further configured to:
   jointly and simultaneously derive the first sub-model associated with the pure seismic data and the second and third sub-models associated with the man-made device and the another man-made device.

17. The computing device of claim 14, wherein the processor is further configured to:
   compute the model m by solving an inverse problem based on an L transform; and
   apply an L' transform to the model m to obtain the output seismic dataset d'.

18. The computing device of claim 14, wherein the processor is further configured to:
   compute the model m by solving an inverse problem based on an L transform;
   apply an L' transform to the model m to obtain the noise data n; and
   subtract the noise data n from the input seismic data d to obtain the output seismic dataset d'.

19. The computing device of claim 14, wherein the first domain is a time-space domain and the second domain is one of a radon domain, frequency-wave number domain, tau-p domain, parabolic domain, shifted hyperbola domain, singular value decomposition domain, rank reduction domain and curvelet domain.

20. A non-transitory computer readable medium including computer executable instructions, wherein the instructions, when executed by a computer, implement a method for denoising input seismic data d, the method comprising:
   receiving the input seismic data d recorded in a first domain by seismic receivers, wherein the input seismic data d includes pure seismic data ss relating to an exploration source and coherent noise data n generated by a man-made device;
   generating a vector model m as a vector in a second domain, which is different from the first domain, to describe the input seismic data d, wherein the vector model m includes a first sub-model for the pure seismic data ss and a second sub-model for the man-made device; and
   processing the vector model m to obtain an output seismic dataset d' indicative of seismic data substantially free of the coherent noise data n generated by the man-made device.

* * * * *